INVENTORS
ABRAHAM RUTKOVSKY
SAM RUTKOVSKY
ATTORNEYS

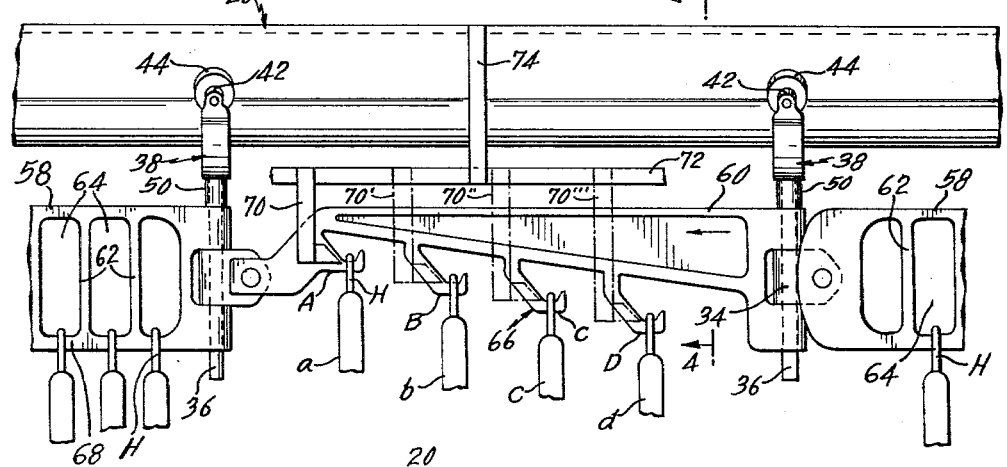
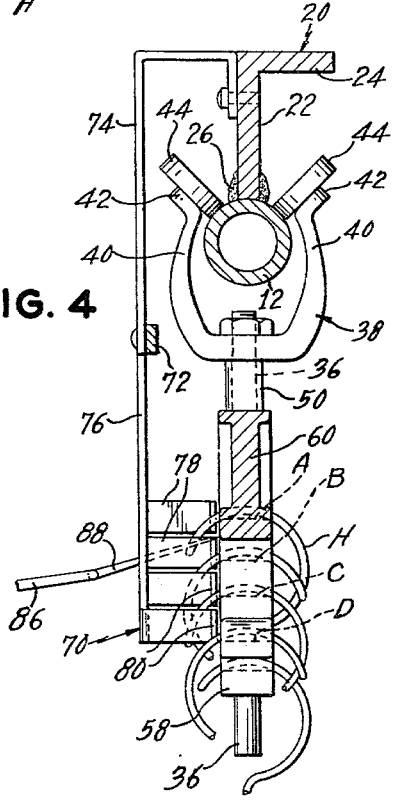
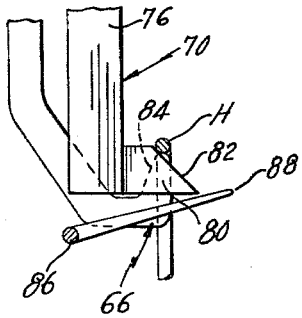

3,184,042
ARTICLE HANDLING APPARATUS
Abraham Rutkovsky and Sam Rutkovsky, Brooklyn, N.Y.,
 assignors to Railex Corporation, Brooklyn, N.Y., a
 corporation of New York
Filed Dec. 27, 1961, Ser. No. 162,487
The portion of the term of the patent subsequent to
Jan. 21, 1981, has been disclaimed
5 Claims. (Cl. 198—177)

This invention relates to article handling apparatus and, more particularly, to apparatus for the storing and delivering of articles.

One of the objects of the present invention is to provide an apparatus for dispatching articles to preselected locations and which also includes provision for storing articles and delivering them to a preselected location when delivery is required.

Another object is to provide apparatus of the indicated type with an endless article carrying rack which is movable along a rail and which includes provision for storing articles as well as the automatic delivery and removal of selected articles from the rack.

A further object is to provide article handling apparatus which is of simple construction and design and which is capable of simultaneously performing both functions of article storing and selective delivery.

The above and other objects, features and advantages of the invention will be more fully understood from the following description of the invention considered in connection with the accompanying drawings which are to be considered illustrative of the invention and not in limitation thereof.

In the drawings:

FIG. 3 is a side elevational view of part of the apparatus;

FIG. 4 is a vertical sectional view, on a larger scale, taken on line 4—4 of FIG. 3; and FIG. 5 is a detail side view illustrating the removal of an article from the article carrying rack.

Figure 1:
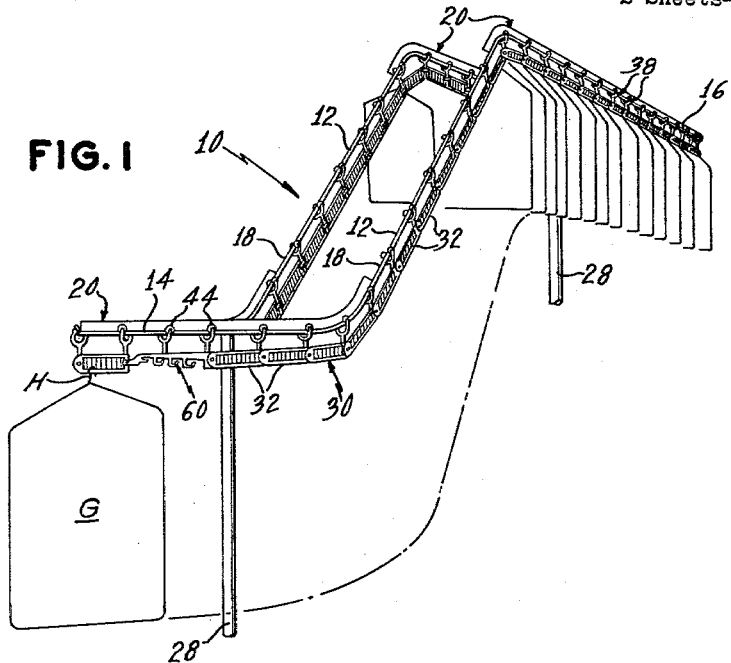
FIG. 1 is a perspective view of the apparatus in accordance with the present invention.
Figure 2:
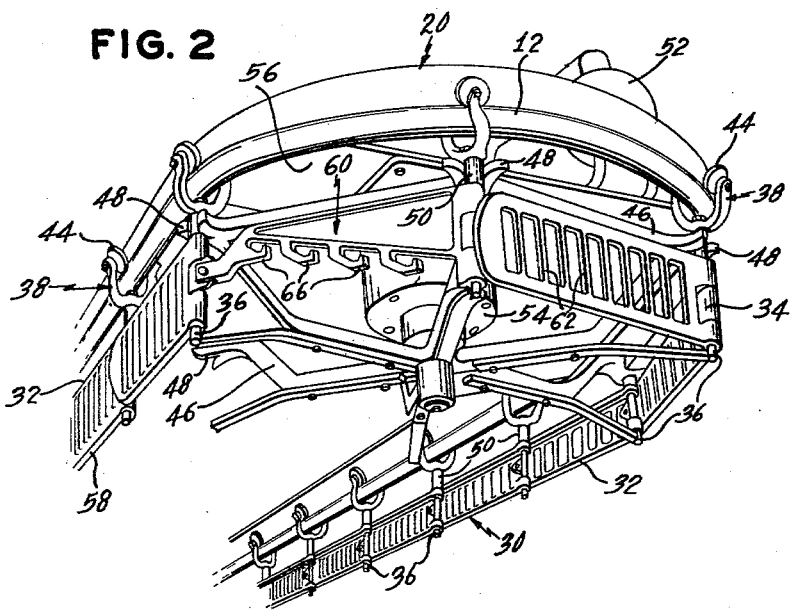
FIG. 2 is a perspective view of one end of the apparatus.

In accordance with the invention, briefly described, the apparatus comprises an endless article carrying rack which is movable along a rail and which includes provision for storing a plurality of articles thereon as well as delivering selected articles only from the conveyor to a preselected location along the path of travel of the rack. While useful for the handling, storing and delivering of many articles, the apparatus is especially useful in the dry cleaning and laundry fields where articles which are to be processed are delivered to a station and processed articles are picked up at the station. In accordance with the invention, the incoming articles are placed on the rack and are carried on the rack to a preselected location where they are automatically removed from the rack for processing. The finished article is subsequently placed back on the rack and is stored thereon until the time for its delivery to a particular location along the path of travel of the rack which may be the same location at which the article was originally placed on the rack for processing. When the article is to be delivered, the rack is operated and carries the finished article to the preselected location where it is removed from the rack. The invention will now be described in detail with respect to the drawings.

The article storing and delivering apparatus 10 which, as herein shown, is the floor-to-ceiling inclined type, comprises an endless stationary rail 12 which is made preferably from a hollow tube and includes lower horizontal end portion 14, upper horizontal end portion 16 and spaced inclined side portions 18. Each of the end portions of the rail is in the form of a semicircle and is provided with a supporting frame member 20 which is constituted by an angle having a vertical web 22 (FIG. 4) and a horizontal flange 24. Each of the frame members is secured to rail 12 along the upper surface thereof by a series of horizontally spaced welds 26 provided along the lower edge of web 22, but it will be understood that the frame members may be secured to the rail by other means. A cross member (not shown) underlies the flanges 24 of the frame members at the upper and lower ends of the rail and is secured to said flanges by welding or by other suitable connections. A pair of floor supporting stanchions 28 are disposed laterally inwardly of rail 12 and underlie the cross members for supporting the rail above the floor.

An endless article supporting rack or conveyor 30 is mounted for movement lengthwise along the rail. The rack is made up of a series of rigid rack members or links 32 which are disposed in end-to-end relation and are pivotally connected to each other at the respective adjacent ends by a universal joint connection 34 which permits adjacent links to pivot horizontally as well as vertically with respect to each other so that the rack 30 can conform to the contour of the rail 12.

The universal joint connection includes a vertically extending pivot pin 36 and a trolley yoke 38 is pivotally mounted on the upper end of each pin and is provided with upstanding laterally spaced arms 40 which straddle rail 12. The arms terminate in angular bearing portions 42 which support axle pins upon which rotary trolley rollers 44 are mounted. The trolley rollers are disposed in angular relation to rail 12, in straddling relation with web 22 of the frame member so that the article supporting rack 30 is suspended from the rail and is adapted to travel along the length thereof.

The means for driving the article supporting rack for movement along and around rail 12 is mounted at the upper end 16 of the rail and comprises a sprocket wheel 46 which is disposed in concentric relation to the semicircular end portion of the rail. In this regard it will be noted that only one sprocket wheel is provided and no follower sprocket wheel has been found necessary for the lower end of the article carrying rack. The links 32 of the rack are rigid members and very little clearance is provided between the universal connection 34 of the links so that the rack remains taut without the necessity of a follower sprocket wheel.

Sprocket wheel 46 is provided with teeth 48 spaced along its circumference and the length of the spaces between the teeth is equal to the distance between the pivot pins 36. Each pivot pin is provided with a rotary sleeve 50 which is engaged by the teeth 48 of the sprocket wheel to drive the article carrying rack. The sprocket wheel is driven by a motor 52 and a speed reduction gear 54 which are mounted on a supporting plate 56. The supporting plate is secured to flange 24 of the upper frame member 20. Suitable switch means, not shown, are provided for operating the motor which is of the reversible type so that the article carrying rack may be driven in opposite directions, as desired or as required.

In accordance with the invention, certain links 58 of the article carrying rack are provided with means for storing and carrying articles only and certain other links 60 are provided with means for both carrying articles and for the selective removal thereof. In this manner the apparatus simultaneously performs the function of storage and delivery and the funtion of article carrying and selective delivery during the movement of rack 30. Storage links 58 are utilized for storing and deliverying articles and dispatching links 60 are utilized for carrying articles to preselected locations and for discharging said articles at these locations.

The storage links 58 have horizontally spaced vertically extending dividing members 62 which form laterally spaced openings 64 that receive the hangers H of the garments G, as shown in FIG. 1. In this manner the garments are supported and carried by rack 30 along the rail 12. When the customer comes in to pick up his garment, the rack is operated until the garment is brought to the position of the customer, at which time it is removed from the rack and handed to the customer.

The dispatching links 60 each include a series of article supporting hooks 66 which, as herein shown, are integral with the link. The hooks are spaced from each other longitudinally of the link and each hook is at a different level than the levels of the other hooks of the link. Although four hooks are shown, it will be understood that any number of hooks may be provided on each link. As viewed in FIG. 3, the rack 30 is traveling from right to left and the leading hook 66 is at the highest level and each succeeding hook is at a level which is lower than the preceding hook. It is also to be noted that the level of part 68 (FIG. 3) of storage links 58, from which the hooks of the stored articles are suspended is lower than the level of any one of the hooks 66, for reasons which will be more clearly understood hereinafter.

Each of the hooks 66 is adapted to carry the hooks H of articles which differ in classification so that a selective delivery of different classifications af articles to different pre-selected locations along the path of travel of the rack can be effected. More particularly, the hooks A, B, C and D of each link are each adapted to carry a different classification of articles a, b, c and d. For example, hook A may carry trousers, hook B may carry laundry, hook C may carry dresses and hook D coats. In accordance with the invention, these various classifications of articles are delivered by the rack 30 to various preselected locations along the path of travel of the rack and are automatically discharged from the rack at the particular preselected location for that classification of articles.

To accomplish this, a stationary pusher 70 is positioned along the path of travel of the rack at a location where articles of a particular classification are to be delivered. The number of pushers provided is the same as the number of hooks 66 of a link and it will be understood that the pushers are spaced from each other longitudinally along the path of travel of the rack and that a pusher is positioned at each location where articles of a particular classification are to be removed from the rack.

As shown in FIG. 3, pushers 70', 70" and 70''' are illustrated in dotted lines to indicate that the position shown for these pushers are not their true positions but the pushers are illustrated in these positions to simplify the explanation of the invention. Each pusher is at a level which is the same as the level of the corresponding hook 66 to which the pusher is operatively related for removing articles therefrom.

Each pusher is supported from the frame 20 of the apparatus by a bracket 72 and a strap 74. The pusher comprises a vertical part 76 which is secured at its upper end to the bracket 72 and the lower end of the pusher includes a cross piece 78 and an article hook engaging part 80 which has a slanted cam edge 82. As best seen in FIG. 4, the side of part 80 of the pusher is adjacent to but slightly spaced from the side of hook 66 and edge 82 is in position to engage the hook H of the article as said hook passes the position of the pusher which causes the hook to be lifted upwardly along the incline 84 of hook 66 until the hook H clears the upper end of the upturned part of hook 66, at which time the hook H and the article G are free of the hook 66 and the hook H slides down the inclined edge 82 of the pusher to fall into a bin or receptacle with the article G. The angle of the incline 82 is steep enough to prevent the hook H of the articles from falling off hooks 66 as said hooks travel down an inclined path.

In lieu of providing a bin for receiving the falling articles, a slick rail 86 may be provided at each pusher with the end of the slick rail in the same plane as edge 82 and slightly below the pointed end of said edge, as shown in FIGS. 4 and 5. The end 88 of the slick rail is preferably tapered to provide a small pointed end to catch the falling hook H and the slick rail is downwardly inclined to carry the article by gravity along its length to another position. In this manner the articles are removed from the rack at the position of the pusher and are subsequently moved along the slick rail to another position which may be remote from the rack.

It will be apparent that in order to avoid interference between the articles carried on the hooks 66, it is necessary to remove the articles from the rack according to a definite sequence. More particularly, the articles a on hooks A of each link 60 of the chain are removed first and therefore the pusher 70 is located at the position along the passage of the rack where articles a are to be delivered first. Since pusher 70 is at the highest level, the article hooks H carried by succeeding hooks B, C and D pass under pusher 70 and are free to continue on to other locations at which they are removed from the rack. Obviously, the next articles to be removed from the rack are those carried by hooks B of each of the links 60 and pusher 70' will accordingly be located along the path of travel of the rack at a position where it is desired to remove the second group of articles b from the rack which are carried by hooks B. In a similar manner, pusher 70" and 70''' are located at different positions along the path of travel of the conveyor and it will be apparent that pusher 70" will be located at a position which is ahead of pusher 70''' and as the articles carried by hook C pass pusher 70", they are removed from the rack and in a similar manner the articles d carried by hooks D are removed from the rack as they pass pusher 70'''. Also it will be noted that the hooks H of the articles carried by storing links 58 are at a level which is below any of the pushers 70. Accordingly, during the travel of the rack 30 the pushers do not engage the hooks H of the articles carried by links 58 so that these articles are not automatically removed from the rack but move with the rack and are stored thereon until they are called for.

While the function of hooks, A, B, C and D has been described above as being utilized for delivering different classifications of articles to different preselected locations along the path of travel of the rack, it will be understood that said hooks may also be used to deliver the same classification of articles but to deliver these articles to different locations along the path of travel of the rack. In such a case, the articles which are to be removed from the rack at the first preselected location are carried by the hooks A of each link 60 of the rack and the articles which are to be removed from the rack at the second location along the path of travel of the rack are carried by hooks B of each link 60 of the rack. Hooks C of each link 60 of the rack carry articles which are to be delivered to the third position and hooks D of each link 60 of the rack carry articles which are to be delivered to the fourth position along the path of travel of the rack and, if additional locations of delivery are required, additional article carrying hooks 66 would be provided on each link 60 of the rack so that the number of hooks 66 provided on each link 60 of the rack would be the same as the number of delivery locations. It will be understood that this is similarly true in the case of different classifications of goods wherein the number of hooks 66 provided in each link 60 of the rack corresponds to the number of different classifications of articles.

Also, it will be understood that a combination of the foregoing can be effected. For example, as illustrated herein, there are four article carrying hooks 66 provided on each link 60 of the rack and these hooks may carry only two classifications so that the same classification of articles can be discharged at two different locations and the other classification of articles can also be discharged at two other different locations.

It will be further understood that as many storage links 58 and dispatching links 60 can be provided for the article supporting rack 30 as may be desired or as may be necessary. It is also within the scope of the invention to utilize an article conveying rack which is of the horizontal type rather than the floor-to-ceiling inclined type shown herein.

This application is related to our co-pending application Serial No. 100,866, filed April 5, 1961, and assigned to the assignee of the present application (now U.S. Patent No. 3,118,531 issued January 21, 1964). It will be understood that it is within the scope of the invention to provide other article removing devices than that described hereinbefore, for example, those shown and described in said U.S. Patent No. 3,118,531.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims. Also, it will be understood that while the articles are shown herein as being suspended from hooks H, they may also be suspended from rings or any other equivalent member and the term "hook" in the claims is to be interpreted to mean hooks or rings or any other equivalent member.

What is claimed is:

1. Conveyor apparatus comprising, an endless rail, an endless article carrying chain mounted for circulatory movement on said rail and comprising an endless series of links disposed in end-to-end relation and pivotally connected to each other at their respective adjacent ends, a plurality of said links each having a similar series of article carrying hooks longitudinally spaced from each other, said hooks of each one of said plurality of links corresponding to the hooks of each one of the other links of said plurality of links, a series of spaced article removing operating means, corresponding to each one of said series of article carrying hooks of said plurality of links, and positioned to be passed by said article carrying hooks as said chain moves around said rail, each of said article removing operating means being positioned relative to a corresponding one of said article carrying hooks of each one of said series of article carrying hooks for control by passage of said corresponding one article carrying hook to cause removal of the article carried by said corresponding one article carrying hook, and another plurality of said links each having a similar series of article carrying means, each article carrying means being positioned relative to each article removing operating means to avoid removal of the article carried by the article carrying means as the latter passes the position of each article removing operating means during movement of said chain and the article removing operation from said article carrying hooks.

2. Conveyor apparatus comprising, an endless rail, an endless article carrying chain mounted for circulatory movement on said rail and comprising an endless series of links disposed in end-to-end relation and pivotally connected to each other at their respective adjacent ends, a plurality of said links each having a similar series of article carrying hooks longitudinally spaced from each other, said hooks of each one of said plurality of links corresponding to the hooks of each one of the other links of said plurality of links, a series of spaced article removing operating means, corresponding to each one of said series of article carrying hooks of said plurality of links, and positioned to be passed by said article carrying hooks as said chain moves around said rail, each of said article removing operating means being positioned relative to a corresponding one of said article carrying hooks of each one of said series of article carrying hooks for control by passage of said corresponding one article carrying hook to cause removal of the article carried by said corresponding one article carrying hook, and another plurality of said links each comprising a rigid member having a similar series of longitudinally spaced openings for carrying articles, each opening of each series of openings being positioned relative to each article removing operating means to avoid removal of the article carried in the opening as the latter passes the position of each article removing operating means during movement of said chain and the article removing operation from said article carrying hooks.

3. Conveyor apparatus comprising, an endless rail, an endless article carrying chain mounted for circulatory movement on said rail and comprising an endless series of links disposed in end-to-end relation and pivotally connected to each other at their respective adjacent ends, a plurality of said links each having a similar series of article carrying hooks longitudinally spaced from each other, said hooks of each one of said plurality of links corresponding to the hooks of each one of the other links of said plurality of links, said article carrying hooks of each series of article carrying hooks being at different levels, respectively, a series of spaced article removing operating means, corresponding to each one of said series of article carrying hooks of said plurality of links, and positioned to be passed by said article carrying hooks as said chain moves around said rail, each of said article removing operating means being positioned relative to a corresponding one of said article carrying hooks of each one of said series of article carrying hooks for control by passage of said corresponding one article carrying hook to cause removal of the article carried by said corresponding one article carrying hook, and another plurality of said links each having a similar series of article carrying means, each article carrying means being positioned relative to each article removing operating means to avoid removal of the article carried by the article carrying means as the latter passes the position of each article removing operating means during movement of said chain and the article removing operation from said article carrying hooks.

4. Conveyor apparatus comprising, an endless rail, an endless article carrying chain mounted for circulatory movement on said rail and comprising an endless series of links disposed in end-to-end relation and pivotally connected to each other at their respective adjacent ends, a plurality of said links each having a similar series of article carrying hooks longitudinally spaced from each other, said hooks of each one of said plurality of links corresponding to the hooks of each one of the other links of said plurality of links, said article carrying hooks of each series of article carrying hooks being at different levels, respectively, a series of spaced article removing operating means, corresponding to each one of said series of article carrying hooks of said plurality of links, and positioned to be passed by said article carrying hooks as said chain moves around said rail, each of said article removing operating means comprising a rigid elongated member having an article removing end positioned relative to a corresponding one of said article carrying hooks of each one of said series of article carrying hooks for control by passage of said corresponding one article carrying hook to cause removal of the article carried by said corresponding one article carrying hook, and another plurality of said links each comprising a rigid member having a similar series of longitudinally spaced openings for carrying articles, each opening of each series of openings being positioned relative to each article removing end of each elongated member to avoid removal of the article carried in the opening as the latter passes the position of each end during movement of said chain and the article removing operation from said article carrying hooks.

5. Conveyor apparatus comprising, an endless rail, an endless article carrying chain mounted for circulatory movement on said rail and comprising an endless series of links disposed in end-to-end relation and pivotally connected to each other at their respective adjacent ends, a plurality of said links each having a similar series of article carrying hooks longitudinally spaced from each other, said hooks of each one of said plurality of links corresponding to the hooks of each one of the other links of said plurality of links, said article carrying hooks of each series of article carrying hooks being at different levels, respectively, a series of spaced article removing operating means, corresponding to each one of said series of articles carrying hooks of said plurality of links, and positioned to be passed by said article carrying hooks as said chain moves around said rail, each of said article removing operating means comprising a rigid elongated member having an article removing end positioned relative to a corresponding one of said article carrying hooks of each one of said series of article carrying hooks for control by passage of said corresponding one article carrying hook to cause removal of the article carried by said corresponding one article carrying hook, each of said elongated members having a slick rail extending downwardly from its article removing end, and another plurality of said links each comprising a rigid member having a similar series of longitudinally spaced openings for carrying articles, each opening of each series of openings being positioned relative to each article removing end of each elongated member to avoid removal of the article carried in the opening as the latter passes the position of each end during movement of said chain and the article removing operation from said article carrying hooks.

References Cited by the Examiner

UNITED STATES PATENTS

| 386,314 | 7/88 | Green | 198—38 |
| 3,010,584 | 11/61 | Rutkovsky | 198—177 |
| 3,118,531 | 1/64 | Rutkovsky. | |

FOREIGN PATENTS 1,131,860  10/56  France.

SAMUEL F. COLEMAN, *Primary Examiner.*

WILLIAM B. LABORDE, ERNEST A. FALLER, Jr.,
*Examiners.*